UNITED STATES PATENT OFFICE.

MAX ENGELMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

ORGANIC MERCURY COMPOUNDS.

1,074,781.

Specification of Letters Patent. Patented Oct. 7, 1913.

No Drawing. Application filed February 26, 1913. Serial No. 750,877.

*To all whom it may concern:*

Be it known that I, MAX ENGELMANN, doctor of philosophy, chemist, citizen of the German Empire, residing at Elberfeld, Germany, have invented new and useful Improvements in Organic Mercury Compounds, of which the following is a specification.

My invention relates to the preparation of the hitherto unknown mercury compounds of aryloxy substituted fatty acids which have in the shape of their anhydrids most probably the formula:

(R standing for an aromatic radical, R′ for a hydrocarbon radical).

For producing the new products the aryloxy fatty acids are heated with mercuric oxid or salts of mercury.

The new products are whitish compounds which are insoluble in water, alcohol, ether and benzene, soluble in dilute alkalis. They have proved to be valuable anti-syphilitics characterized by a mild action and the fact that they are non-irritant and not corrosive renders them highly valuable for internal application especially for subcutaneous injection. They have also proved to be valuable disinfecting agents possessing great disinfecting power. They can also be used in the shape of their soluble compounds which can be obtained by treating the new products with alkalis, alkaline salts of amino fatty acids, alkali and such nitrogen compounds as are neutral to litmus and possess at the same time a basic and acid character, alkali and an imino compound, such as caustic soda lye, ammonia, amins, alanin, diethylbarbituric acid, urea, albumoses, acid amids, acid imids, caffein, polypeptids, etc.

In order to illustrate the new process more fully the following example is given, the parts being by weight:—220 parts of mercuric oxid are dissolved in 2500 parts of a 10 per cent. sulfuric acid, 200 parts of ortho-chlorophenoxy-acetic acid are added and the mixture is heated to 70°–90° C. during 2 hours. The resulting oxy-mercuric-ortho-chloro-phenoxy-acetic-acid-anhydrid separates which is purified by resolution from highly dilute caustic soda lye and precipitation with carbonic acid. It is a whitish crystalline compound having no melting point, insoluble in water, alcohol, ether, benzene, soluble in caustic alkalis, sodium carbonate and ammonia. It has most probably the formula:

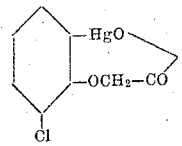

and is split up by hot hydrochloric acid into $HgCl_2$ and ortho-chlorophenoxy-acetic acid. It forms soluble and stable compounds with alanin and alkali, or with diethyl-barbituric acid and alkali, etc.

I claim:—

1. As new products the new mercury compounds derivable from aryloxy substituted fatty acids, which new compounds have in the shape of their anhydrids most probably the formula:

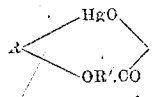

(R standing for an aromatic radical, R′ for a hydrocarbon radical) which products are whitish compounds insoluble in water, alcohol, ether and benzene, soluble in dilute alkalis; yielding soluble compounds with alkali and nitrogen compounds; and being valuable therapeutics, substantially as described.

2. As a new product the new mercury compound derivable from ortho-chloro-phenoxy-acetic acid, which new product has in the shape of its anhydrid most probably the formula:

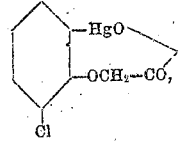

which is a whitish crystalline compound having no melting point; insoluble in water, alcohol, ether, benzene, soluble in caustic alkalis, sodium carbonate and ammonia; yielding soluble compounds with alkali and nitrogen compounds; and being a valuable therapeutic, substantially as described.

In testimony whereof I have hereunto set my hand in the presence of two subscribing witnesses.

MAX ENGELMANN. [L. S.]

Witnesses:
 HELEN NUFER,
 ALBERT NUFER.